United States Patent [19]

Tanaka et al.

[11] Patent Number: 4,623,889

[45] Date of Patent: Nov. 18, 1986

[54] SIGNAL TRANSMITTING DEVICE

[75] Inventors: Hiroaki Tanaka, Nukata; Shigeyuki Akita, Okazaki, both of Japan

[73] Assignee: Nippon Soken, Inc., Nishio, Japan

[21] Appl. No.: 643,828

[22] Filed: Aug. 24, 1984

[30] Foreign Application Priority Data

Sep. 8, 1983 [JP] Japan .................................. 58-165689

[51] Int. Cl.$^4$ ............................................. G08C 19/10
[52] U.S. Cl. .................................. 340/870.37; 74/485; 340/54
[58] Field of Search ..................... 340/870.37, 54, 531; 318/662; 361/329, 299; 324/61 QS, 61 QL; 74/485

[56] References Cited

U.S. PATENT DOCUMENTS 4,242,666  12/1980  Reschovsky et al. ...... 340/870.37 X
4,316,158   2/1982  Akita et al. ............... 331/111
4,558,320  12/1985  Pedrazza ................. 340/870.37 X

*Primary Examiner*—Jerry W. Myracle
*Attorney, Agent, or Firm*—Cushman, Darby & Cushman

[57]  ABSTRACT

A signal transmitting device for transmitting signals from operating switches which are provided on a steering wheel of an automobile to an electric load provided on a body thereof, is disclosed. The device comprises one annular electrode which is provided on a lower end surface of a steering wheel boss rotating with the steering wheel and another annular electrode which is provided on an upper end surface of a steering column cover fixed to the body so as to be opposed to the one annular electrode. These annular electrodes form a capacitor. The device further comprises a signal generating circuit composed of a plurality of resistors having different resistance values which are selectively connected to the one electrode provided on the steering wheel by use of the above described switches, an RC oscillator circuit composed of the above described capacitor which is connected to another annular electrode on the steering column cover and a signal receiving circuit which detects the change in output frequency of the oscillator circuit. The signal generating circuit is provided on the steering wheel while the oscillator circuit and the signal receiving circuit are provided on the body. By operating the switches, the resistor to be connected to the electrode provided on the steering wheel is changed so that the impedance of the line including the capacitor is changed. As a result, the output frequency of the oscillator circuit is changed by steps.

11 Claims, 6 Drawing Figures

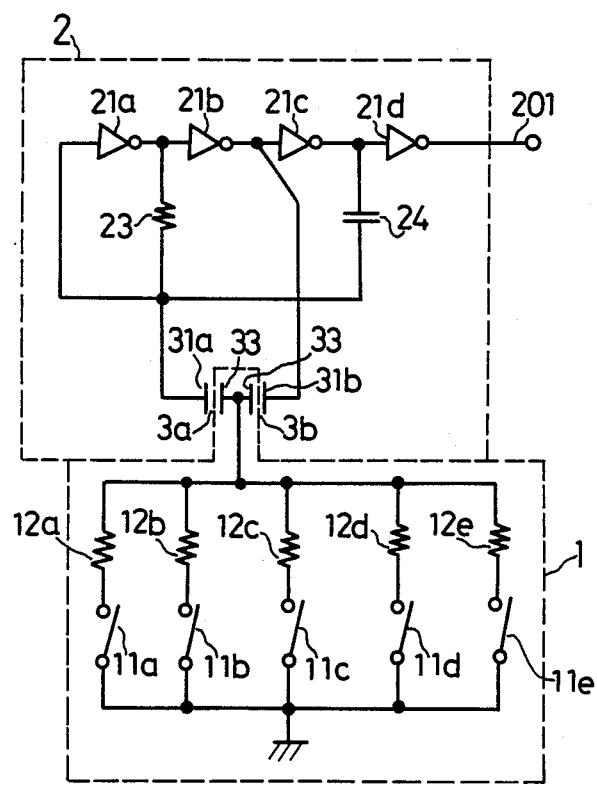
F I G.1

SIGNAL TRANSMITTING DEVICE

BACKGROUND OF THE INVENTION

The present invention relates to a signal transmitting device, particularly to a signal transmitting device by which a transmitting signal generated by an operating apparatus provided on a rotating body such as a steering wheel of an automobile, is effectively transmitted to an operated apparatus provided on a stationary body such as a car body.

Recently, it has been tried to center operating apparatuses for an automatic speed controller, an air conditioner and the like, on a steering wheel.

Conventionally, a horn switch is provided on the steering wheel. The operating signal generated by the horn switch is transmitted to a horn provided on the car body through a slip ring and a brush which is in contact with the slip ring. However, this conventional signal transmitting method requires a large space for accomodating the slip rings of which the number increases as the number of operating signals to be transmitted, increases. And this conventional transmitting method is not suitable to the transmission of a signal which is required to have precision or a signal of a low voltage level since the contact portion of each of the slip ring and the brush is liable to wear away.

SUMMARY OF THE INVENTION

One object of the present invention is to provide a signal transmitting device by which a signal is transmitted from a stationary body to an opposed rotating body or vise versa.

Another object of the present invention is to provide a signal transmitting device which is not provided with a mechanical contact portion through which a signal is transmitted and accordingly free from the lowering of the signal transmitting performance caused by the wear of the above described contact portion.

Still another object of the present invention is to provide a signal transmitting device which enables the transmission of a large number of signals in a compact construction.

A further object of the present invention is to provide a signal transmitting device by which signals are transmitted from operating switches provided on a steering wheel of an automobile to various apparatuses provided on a car body.

The signal transmitting device of the present invention transmits signals from a stationary body to a rotating body which is opposed to the stationary body, or vise versa.

The signal transmitting device comprises a first electrode which is provided on the stationary body, a second electrode provided on the rotating body so as to be opposed to the first electrode, a signal generating circuit which is provided on one of the stationary body and the rotating body and is connected to one of the first electrode and the second electrode for generating a transmitting signal, a high frequency circuit which is provided on the other one of the rotating body and the stationary body and is connected to the other one of the first electrode and the second electrode and which is electrically coupled with the signal generating circuit through a capacitor formed by the first and the second electrodes to generate an output signal of which the frequency is changed by the transmitting signal, and a signal receiving circuit which is electrically connected to the high frequency circuit for recognizing the transmitting signal from the change in frequency of the output signal of the high frequency circuit.

BRIEF EXPLANATION OF THE DRAWINGS

FIG. 1 is a circuit diagram of a signal generating circuit and an oscillator circuit acting as a high frequency circuit;

DETAILED DESCRIPTION OF THE EMBODIMENTS

Figure 2:
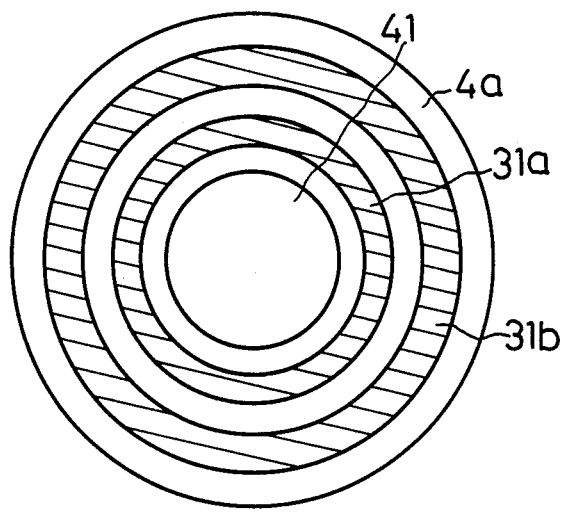
FIGS. 2, 3 are front views of ring plates, on each of which an electrode is formed.

Hereinafter, the present invention will be explained in accordance with the embodiments thereof.

FIG. 1 is a circuit diagram of a signal generating circuit 1 and a resistor-capacitor(RC) oscillator circuit 2 acting as a high frequency circuit. The signal generating circuit 1 is provided on a steering wheel(not shown) of an automobile and the oscillator circuit 2 is accomodated within an instrument panel (not shown) or the like.

The signal generating circuit 1 comprises a plurality of switches 11a, 11b, 11c, 11d, 11e and resistors 12a, 12b, 12c, 12d, 12e having different resistance values, each of which is connected in series to each of the switches 11a to 11e. Each set of the switches 11a to 11e and the resistors 12a to 12e is connected in parallel to the adjacent set thereof.

The oscillator circuit 2 comprises four inverters 21a, 21b, 21c, 21d which are connected in series to one another, a resistor 23, and capacitors 3a, 3b, 24.

The capacitor 3a is composed of an electrode 31a and an electrode 33. The electrode 31a is connected to the resistor 23, the capacitor 24 and an input terminal of the inverter 21a while the electrode 33 is connected to the resistors 12a to 12e which are connected in parallel with one another.

The capacitor 3b is composed of an electrode 31b and the electrode 33. The electrode 31b is connected to an output terminal of the inverter 21b.

Figure 3:
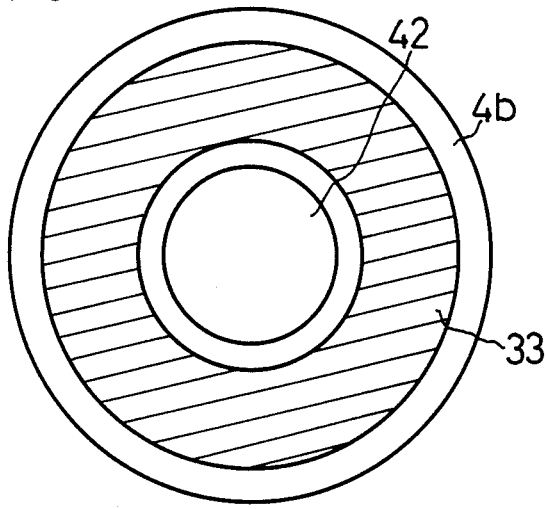

FIGS. 2 and 3 illustrate the shape of the electrodes 31a, 31b and 33. In FIG. 2, annular concentric electrodes 31a, 31b are printed on a ring plate 4a made of electric insulating resin, which is provided with a through hole 41 at a center thereof. In FIG. 3, an annular electrode 33 formed on a ring plate 4b having the same shape as that of the ring plate 4a so as to be opposed to the electrodes 31a, 31b. The ring plate 4b is provided with a through hole 42 at a center thereof.

Figure 4:
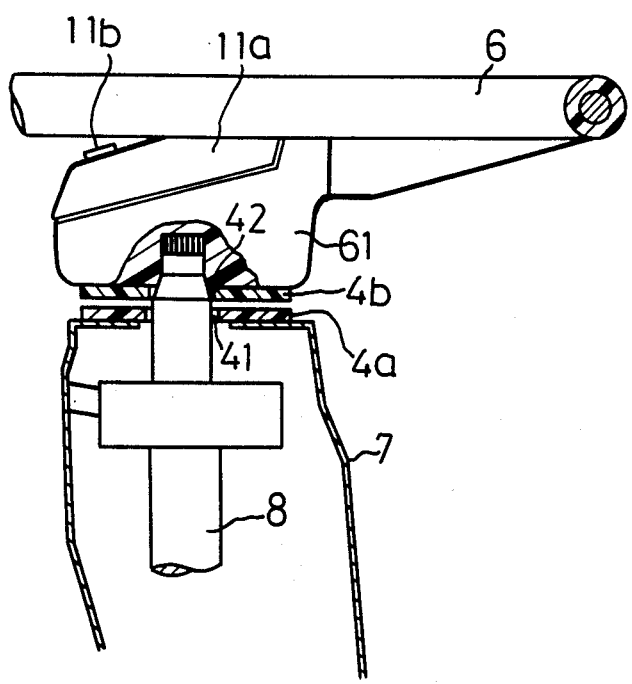
FIG. 4 is a sectional view of side portions of s steering column cover and a steering wheel each of which is provided with a ring plate.

FIG. 4 illustrates the installation of the ring plates 4a, 4b in a steering wheel 6 and a steering column cover 7. In FIG. 4, the steering wheel 6 is provided with a boss 61 at a center thereof. The steering column cover 7 is fixed to a car body. A steering shaft 8 penetrates the steering column cover 7 and one end of the steering shaft 8 is fixed to the lower portion of the boss 61 so that the under surface of the boss 61 is opposed to the upper surface of the column cover 7. The ring plate 4a is joined to the upper surface of the column cover 7 while the ring plate 4b is joined to the under surface of the boss 61. The steering shaft 8 penetrates the through holes 41, 42 of the ring plates 4a, 4b.

In FIG. 4, switches 11a, 11b are provided on the upper surface of the boss 61. The switch 11a is used as a horn switch and the switch 11b is used as a switch for an automatic speed controller.

The capacitors 3a, 3b, each having the above described construction, always have an equal capacitance regardless of the operating angle of the steering wheel 6.

One end of each of the switches 11a to 11e of the signal generating circuit 1 is grounded through a bearing (not shown) which supports the steering shaft 8.

The signal generating circuit 1 is not mechanically in contact with the oscillator circuit 2 but is electrically coupled therewith by means of the capacitors 3a, 3b.

Namely, by selectively closing the switches 11a to 11e of the signal generating circuit 1, the contact point of the capacitors 3a, 3b is grounded through one of the resistors 12a to 12e, to which the closed switch is connected.

As a result, the impedance on the load side of the inverter 21b of the oscillator circuit 2 changes and accordingly, the frequency of the output pulse signal 201 of the oscillator circuit 2 changes.

Figure 5:
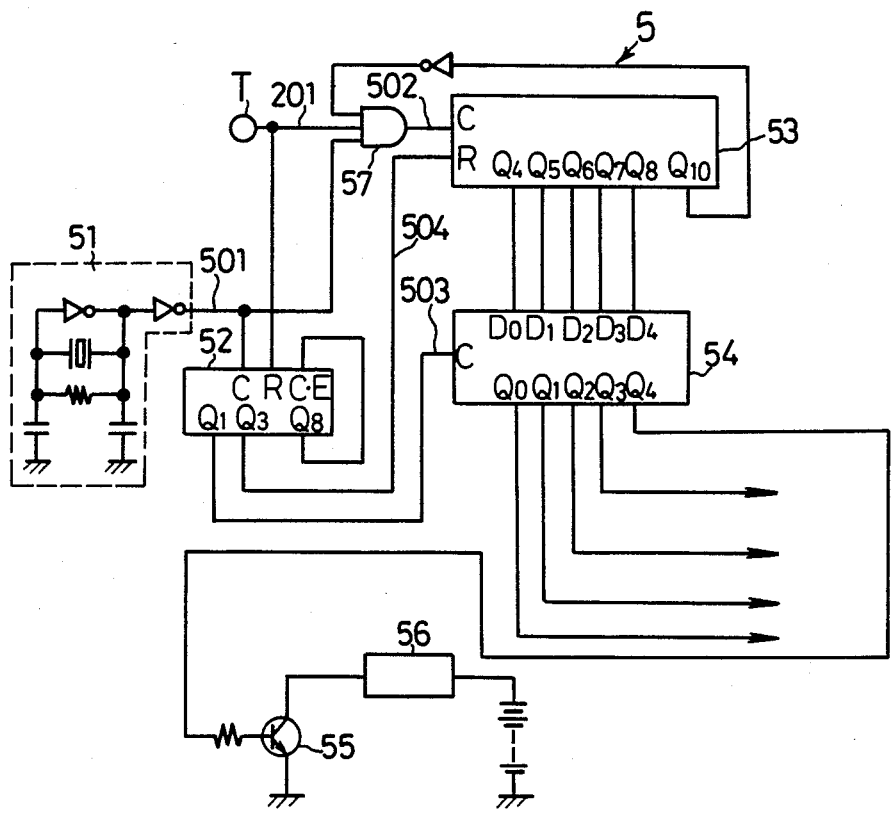
FIG. 5 is a circuit diagram of a signal receiving circuit.

The pulse signal 201 is transmitted to a signal receiving circuit 5 shown in FIG. 5.

Figure 6:
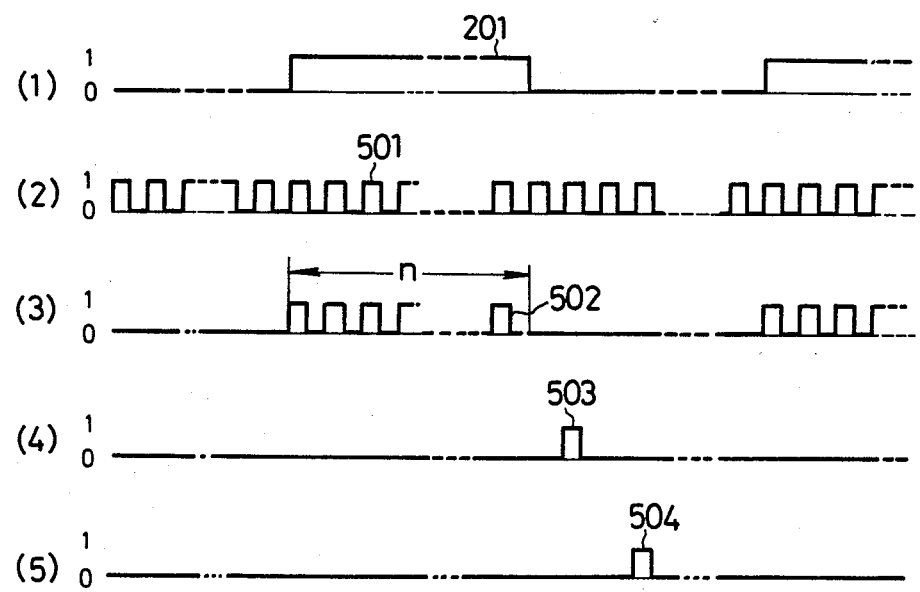
FIG. 6 is a time chart showing a signal waveform.

The waveform of the signal 201 is shown in FIG. 6(1).

In FIG. 5, the reference numeral 51 designates a count pulse generating circuit, the reference numeral 52 designates a decimal counter, the reference numeral 53 designates a binary counter, 54 designates a data latch and 55 designates a transistor which drives an electric load 56 such as a horn.

The pulse signal 201 of the oscillator circuit 2 is transmitted to a gate 57 through a terminal T. The gate 57 is open while the signal 201 is at $\ulcorner 1 \lrcorner$ level. At this time, the pulse signal 501 (FIG. 6(2)) generated by the count pulse generating circuit 51 is inputted to the counter 53 as the pulse signal 502 (FIG. 6(3)) and is counted thereby. The number (n) of the pulses of the signal 502 is shown by the following formula;

$$f/2fi \leq n \leq f/2fi + 1 \quad (1)$$

wherein fi is the frequency of the signal 201, and f is the frequency of the signal 502.

In the above formula, the difference in count caused by asynchronous signals 201, 502, is considered.

The resistance value of the resistor 23 of the oscillator circuit 2 and the capacitance of the capacitors 24, 3a, 3b are set so that the frequency fi of the pulse signal 201 has a relation $f/2fi \geq 512$ when the switches 11a to 11e are open. The counter 53 stops the counting operation at the time when the output of the $Q_{10}$ terminal which is an output terminal of the 10th bit on MSB side of the counter 53, is turned into $\ulcorner 1 \lrcorner$ level. At this time, the output of each of the remaining $Q_4, Q_5, Q_6, Q_7, Q_8$ terminals is at $\ulcorner 0 \lrcorner$ level.

The counter 52 generates a latch signal 502 (FIG. 6(4)) and a counter reset signal 504 (FIG. 6(5)) with lapse of a predetermined time after the falling time of the pulse signal 201. In the above state, the output of the data latch 54 is at $\ulcorner 0 \lrcorner$ level.

When the switch-11a is closed, the frequency fi of the pulse signal 201 changes. The resistance value of the resistor 12a which is connected to the switch 11a is set so that the frequency fi satisfies the condition of $128 \leq f/2fi \leq 134$. In this case, the number (n) of the pulses of the signal 502 inputted into the counter 53 can be obtained from the formula (1). The obtained number (n) has a relation: $128 \leq n \leq 135$. Only the output of the terminal $Q_8$ of the counter 53 is turned into $\ulcorner 1 \lrcorner$ level. At this time the terminal $Q_4$ of the latch 54 is turned into 1 level, receiving the latch signal 503 generated at every falling time of the signal 201 to drive the electric load 56 through the transistor 55. The counter 53 is reset by the reset signal 504 generated after the generation of the latch signal 503.

The resistance value of each of the resistors 12b to 12e is set so that each of the frequency $f_1, f_2, f_3, f_4$ of the pulse signal 201 generated when each of the switches 11b to 11e is closed, satisfies the following formula (2) to (5). As the switches 11b to 11e are successively closed, the output of each of the terminals $Q_3, Q_2, Q_1, Q_0$ of the latch 54 is turned into $\ulcorner 1 \lrcorner$ level successively. As a result, the electric load (not shown) which is connected to the terminals $Q_0$ to $Q_3$ of the latch 54 is driven.

$$64 \leq f/2f_1 \leq 70 \quad (2)$$

$$32 \leq f/2f_2 \leq 38 \quad (3)$$

$$16 \leq f/2f_3 \leq 22 \quad (4)$$

$$8 \leq f/2f_4 \leq 14 \quad (5)$$

As described above, in the signal transmitting device of the present invention, a capacitor is formed by a first electrode which is integrally provided on a boss of a steering wheel acting as a rotating body and a second electrode which is provided on a steering column cover acting as a stationary body so as to be opposed to the first electrode.

The signal generating circuit is provided on the steering wheel and is connected to the first electrode and the oscillating circuit is provided on the car body and is connected to the second electrode. The signal generating circuit is electrically connected to the oscillating circuit through the capacitor. Such a device enables the transmission of a large number of signals in a compact construction. In addition since the rotating body and the stationary body are not in mechanical contact with each other, the device is free from mechanical damage such as wear.

In the above embodiment, one of the resistors 12a to 12e having different resistance values is selected by means of the switches 11a to 11e. Capacitors having different capacitances can be substituted for the resistors 12a to 12e.

By employing variable resistors in place of the fixed resistors employed in the above embodiments, the oscillation frequency of the oscillator circuit 2 can be continuously changed. By making the signal generating circuit 1 detect the change in frequency, an analogue signal such as a temperature setting signal of an air conditioner, can be transmitted.

In the above embodiment, one end of each of the switches 11a to 11e is grounded through a bearing which is used for supporting the steering shaft.

Instead, one end thereof may be grounded through an another capacitor which is composed of electrodes formed on the ring plates 4a, 4b or may be connected to the input terminal or the output terminal of the inverter 21a, or the output terminal of the inverter 21c through such an another capacitor.

In the above embodiment, a pair of capacitors 3a, 3b are formed. When the oscillator circuit has a structure different from that of the above embodiment, a pair of capacitors are not always required.

When the signal transmitting device is used for another purpose, the signal generating circuit may be provided on a stationary body while the oscillator circuit and the signal receiving circuit may be provided on a rotating body.

What is claimed is:

1. A signal transmitting device which performs the signal transmission between a stationary body and a rotating body which rotates at such a position as to be opposed to said stationary body, comprising:
    a first electrode provided on said stationary body;
    a second electrode provided on said rotating body, said second electrode being opposed to said first electrode to compose a capacitor with said first electrode;
    a signal generating circuit which is provided on one of said stationary body and said rotating body and is connected to one of said first electrode and said second electrode for generating a transmitting signal;
    a high frequency circuit which is provided on the other one of said rotating body and said stationary body and is connected to the other one of said second electrode and said first electrode, said high frequency circuit being electrically coupled with said signal generating circuit through said capacitor; the output signal of said high frequency circuit being changed in accordance with the change in said transmitting signal; and
    a receiving circuit which is electrically connected to said high frequency circuit for recognizing said transmitting signal from the change in the output signal of said high frequency circuit.

2. A signal transmitting device according to claim 1, wherein said high frequency circuit is composed of an oscillator circuit of which the circuit constant is changed by said transmitting signal to generate output signal of which the frequency is changed thereby.

3. A signal transmitting device according to claim 2, wherein said oscillator circuit is composed of a resistor-capacitor(RC) oscillator circuit having said capacitor as a circuit element thereof, whereby the impedance of the line comprising said capacitor is changed by said transmitting signal so that the output frequency thereof is changed.

4. A signal transmitting device according to claim 3, wherein said signal generating circuit comprises a variable resistor or a variable capacitor which is connected to said first electrode or said second electrode, whereby the output frequency of said oscillator circuit is continuously changed by continuously changing the resistance value of said variable resistor or the capacitance of said variable capacitor.

5. A signal transmitting device according to claim 3, wherein said signal generating circuit comprises a plurality of resistors or capacitors having different resistance values or capacitances; and switches which selectively connect one of said resistors or said capacitors, to said first or second electrode so as to change the impedance of said line whereby the output frequency of said oscillator circuit is changed by steps.

6. A signal transmitting device according to claim 5, wherein said signal receiving circuit recognizes the operation of said switches from the output frequency of said oscillator circuit which changes by steps and drives one electric load which is previously determined in accordance with the output frequency of said oscillator circuit.

7. A signal transmitting device according to claim 2, wherein said signal receiving circuit recognizes the change in said transmitting signal from the change in the output frequency of said oscillator circuit and drives an electric load in accordance with the change in said transmitting signal.

8. A signal transmitting device according to claim 1, wherein each of said first and second electrode is a circular electrode of which the center is positioned at a rotating axis of said rotating body.

9. A signal transmitting device according to claim 8, wherein said first or second electrode which is connected to said signal generating circuit, is composed of a single annular electrode; said first or second electrode which is connected to said high frequency circuit is composed of two annular electrodes; and said first electrode and said second electrode compose a pair of capacitors.

10. A signal transmitting device according to claim 8, wherein said second electrode is formed on an annular end surface of a first supporting member which is provided around a steering shaft of an automobile and rotates with a steering wheel; said first electrode is formed on an annular end surface of a second supporting member which is provided around said steering shaft and is fixed to a car body so as to be opposed to said second electrode; and said signal generating circuit is provided on said steering wheel and said high frequency circuit and said signal receiving circuit are provided on said car body.

11. A signal transmitting device according to claim 10, wherein said first supporting member is a steering wheel boss, said second electrode is fixed to an annular lower end surface of said boss; said second supporting member is a steering column cover and said first electrode is fixed to an upper end surface of said column cover, which is opposed to said lower end surface of said steering wheel boss.

* * * * *